US008069653B2

(12) United States Patent
Ganzer (10) Patent No.: US 8,069,653 B2
(45) Date of Patent: Dec. 6, 2011

(54) INTERCHANGEABLE NOZZLE FOR A DISPENSING MODULE

(75) Inventor: Charles P. Ganzer, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 2270 days.

(21) Appl. No.: 10/271,644

(22) Filed: Oct. 16, 2002

(65) Prior Publication Data

US 2004/0074994 A1    Apr. 22, 2004

(51) Int. Cl.
*F01N 3/00*    (2006.01)
(52) U.S. Cl. .................. 60/286; 239/533.9; 239/533.11
(58) Field of Classification Search ............... 239/533.9, 239/533.4, 533.6, 533.11, 533.12, 533.3, 239/589, 596, 601, 533.2; 60/286, 303
See application file for complete search history.

(56) References Cited

U.S. PATENT DOCUMENTS

| | | | |
|---|---|---|---|
| 2,008,803 A * | 7/1935 | Stephan ........................ 313/120 |
| 2,247,110 A | 6/1941 | Anderson |
| 2,457,733 A | 12/1948 | Rodman et al. |
| 2,927,737 A * | 3/1960 | Zeuch et al. ............... 239/533.3 |
| 3,672,578 A * | 6/1972 | Wayne ........................... 239/590 |
| 3,767,164 A | 10/1973 | Robinson |
| 3,836,080 A * | 9/1974 | Butterfield et al. ............. 239/96 |
| 4,153,205 A * | 5/1979 | Parrish, Jr. .................. 239/533.9 |
| 4,273,291 A * | 6/1981 | Muller ...................... 239/533.12 |
| 4,540,126 A * | 9/1985 | Yoneda et al. ............. 239/533.4 |
| 4,707,278 A | 11/1987 | Breyer et al. |
| 4,801,095 A * | 1/1989 | Banzhaf et al. ............ 239/533.3 |
| 5,375,738 A | 12/1994 | Walsh et al. |
| D366,051 S | 1/1996 | Lewis et al. .................. D15/138 |
| 5,598,974 A | 2/1997 | Lewis et al. .................... 239/135 |
| 5,633,094 A | 5/1997 | Takeshima et al. |
| 5,707,010 A | 1/1998 | Manfre et al. |
| 5,873,528 A | 2/1999 | Lewis et al. .................... 239/135 |
| 5,924,607 A | 7/1999 | Yamada et al. ............... 222/504 |

(Continued)

FOREIGN PATENT DOCUMENTS

EP    0046664 A1    3/1982
(Continued)

OTHER PUBLICATIONS

European Patent Office, European Search Report issued in related European Application Serial No. EP 03 02 1062 dated Jul. 28, 2009.

*Primary Examiner* — Thomas Denion
*Assistant Examiner* — Diem Tran
(74) *Attorney, Agent, or Firm* — Wood, Herron & Evans, LLP (57) ABSTRACT

A dispensing module having a dispenser body having a liquid passageway, a valve element movably mounted within the liquid passageway, and a nozzle removably coupled with the dispenser body. The nozzle has a valve seat contacted by a tip of the valve element for modulating liquid flow through the liquid passageway. The tip may be made of a harder material than the valve seat and may have a surface finish characterized by an Ra less than or equal to about 32 microinches. The tip may have a compound angle provided by contiguous frustoconical surfaces of differing included angles in which one frustoconical surface contacts the valve seat. The nozzle is configured to be attached to the dispenser body so that the valve seat and a sealing surface of the valve element tip form a circular line of contact when among multiple different nozzles and dispenser bodies.

46 Claims, 3 Drawing Sheets

U.S. PATENT DOCUMENTS

| | | | |
|---|---|---|---|
| 5,934,520 A | 8/1999 | Byerly et al. | 222/504 |
| 5,934,521 A | 8/1999 | Yamada et al. | 222/504 |
| 6,036,106 A | 3/2000 | Peet | 239/135 |
| 6,056,155 A | 5/2000 | Byerly et al. | 222/1 |

FOREIGN PATENT DOCUMENTS

| | | | |
|---|---|---|---|
| EP | 0300081 | A2 | 1/1989 |
| EP | 0721802 | A2 | 7/1996 |
| EP | 0913206 | A2 | 5/1999 |
| EP | 1123752 | A2 | 8/2001 |
| EP | 1128109 | A1 | 8/2001 |
| FR | 1463455 | A | 12/1966 |
| GB | 2203522 | A | 10/1988 |
| GB | 2223270 | * | 4/1990 |
| WO | 9810251 | A1 | 3/1998 |
| WO | 0067916 | A1 | 11/2000 |
| WO | 0072977 | A2 | 12/2000 |

* cited by examiner

INTERCHANGEABLE NOZZLE FOR A DISPENSING MODULE

FIELD OF THE INVENTION

The present invention relates to devices for dispensing liquids and, in particular, to liquid dispensing modules equipped with interchangeable nozzles.

BACKGROUND OF THE INVENTION

Dispensing modules are commonly used to dispense viscous liquids, such as hot melt adhesives, in a variety of dispensing applications employed in the manufacture of products and in product packaging. Conventional dispensing modules are provided with either electrically actuated or electro-pneumatically valve assemblies that regulate the flow and discharge of liquid from the module. Typically, the valve assembly incorporates a needle that is movable within the body of the dispensing module for selectively displacing a tip of the needle relative to a valve seat between open and closed positions. In the closed position, the tip seals against the valve seat with a continuous line of contact that discontinues liquid flow to a dispensing orifice. Cyclic movement between the open and closed positions intermittently interrupts flow to generate a pattern of liquid on a receiving surface of the product or product packaging.

In certain dispensing modules, the dispensing orifice is provided in a nozzle which is itself removably attached to the body of the dispensing module. The ability to remove the nozzle from the body of the dispensing module has certain benefits. For example, the nozzle may be detached from the body for removing foreign debris, such as particles originating from charred viscous liquid, blocking the dispensing orifice or the liquid passageway leading to the dispensing orifice.

Under certain circumstances, it may be desirable to change the diameter of the dispensing orifice in order to modify an attribute of the liquid dispensing operation. For example, the diameter change may either increase or decrease the amount of liquid being dispensed. As another example, the diameter change may alter the abruptness of the liquid cut-off when the needle tip is moved from the open position to contact the valve seat to provide the closed position. Moreover, the dispensing orifice diameter may require changing if the orifice repeatedly clogs because of the type of liquid being dispensed, a change in the type of liquid being dispensed, or a change in the characteristics of the dispensing operation.

In certain conventional dispensing modules, the valve seat of the nozzle and the needle tip constitute a matched pair manufactured with corresponding dimensional tolerances. Any attempt to exchange one nozzle of one dispensing orifice diameter for another nozzle of a different dispensing orifice diameter in such dispensing modules often results in leakage due to an inability to provide an adequate sealing engagement between the needle tip and valve seat of the new nozzle. One source of leakage is misalignment between the needle tip and valve seat of the new nozzle such that the line of contact between the two is not continuous. Another source of leakage arises due to wear and erosion of the needle tip and valve seat, which creates correlated surface features in each after a sufficient number of cycles. Placing the nozzle carrying a used valve seat on a different dispensing module having a needle tip with non-correlated surface features creates leakage paths for the liquid past their line of contact when the needle tip is contacting the valve seat. In such dispensing modules, therefore, the diameter of the dispensing orifice may be changed only by replacing the existing dispensing module with a dispensing module having a different orifice diameter.

What is needed, therefore, is a nozzle for a liquid dispensing module that is freely interchangeable among various different dispensing modules independent of the cycle life of either the nozzle or the needle of the dispensing module.

SUMMARY OF THE INVENTION

The present invention provides a detachable nozzles for dispensing modules and dispensing modules that overcome the drawbacks and disadvantages of prior nozzles and dispensing modules. In one embodiment, a nozzle for a dispensing module includes a nozzle body having an inlet, an outlet, a liquid passageway extending from the inlet to the outlet, and a valve seat in the liquid passageway. The liquid passageway has a frustoconical bore tapering conically toward the outlet. The valve seat is positioned in the liquid passageway between the inlet and the frustoconical bore.

In another embodiment, a nozzle according to the principles of the invention is configured for removable mounting with a dispenser body in a liquid dispensing system in which the dispenser body further includes a liquid supply passage and a movable valve element carrying a sealing surface centered symmetrically about an axis. The nozzle includes a nozzle body configured to be removably mounted to the dispenser body. The nozzle body includes a liquid passageway coupled in fluid communication with the liquid supply passage, a valve seat positioned in the liquid passageway, and a dispensing orifice downstream of the valve seat. The valve seat is selectively contacted by the sealing surface for regulating liquid flow in the liquid passageway to the dispensing orifice. The nozzle body further includes a locating element that is substantially concentric with the valve seat. The locating element is configured for positioning the valve seat in a substantially coaxial relationship with the axis when the nozzle body is mounted to the dispenser body. The locating element aids in establishing a predictable alignment between the sealing surface of the valve element and the valve seat.

The reproducible positioning of the valve seat relative to the sealing surface of the valve element promotes nozzle exchange with the dispenser body. For example, a new nozzle may be coupled with a used dispensing module or a used nozzle removed from one dispensing module may be coupled with a different new or used dispensing module. Moreover, the interchangeability is accomplished without a significant risk of leakage after the nozzle is exchanged. This is possible, according to the invention, because the line of contact between the sealing surface of the valve element and the valve seat is predictable among multiple different valve elements and valve seats.

According to another aspect of the invention, a valve element is provided for a dispensing module that comprises an elongated body having an apex, a first frustoconical surface configured to make a sealing engagement with a valve seat of the dispensing module, and a second frustoconical surface contiguous with the first frustoconical surface and positioned between the first frustoconical surface and the apex. The first frustoconical surface has a first included angle that tapers conically toward the apex and the second frustoconical surface has a second included angle that likewise tapers conically toward the apex. The first included angle is larger than the second included angle and, typically, is about 5° larger than the second included angle.

According to another aspect of the invention, a dispensing module is provided that includes a dispenser body having a liquid passageway with a valve seat and a dispensing orifice, and a valve element movably mounted within the liquid passageway. The valve element has a tip movable relative to the valve seat between an open position in which the tip is disengaged from the valve seat such that liquid flows to the dispensing orifice and a closed position in which the tip engages the valve seat to block liquid flow to the dispensing orifice. The tip has a surface hardness greater than a surface hardness of the valve seat and the tip also has a surface finish characterized by an Ra (an arithmetic average of the absolute value of the departures of the surface roughness profile from a mean line on the surface) less than or equal to about 32 microinches. The valve seat may be provided in a nozzle that is adapted to be detachably mounted to the dispensing body.

The improved surface finish of the tip of the valve element and the enhanced hardness of the tip relative to the valve seat addresses the problem of wear at the interface between the tip and valve seat among different nozzles and dispenser bodies by reducing the wear of the tip relative to the valve seat and by reducing the feature size of any surface imperfections formed on the valve seat resulting from cyclic contact with the tip. As a result, nozzles are more readily interchangeable among different dispenser bodies because the probability of leakage is significantly reduced. The interchangeability of the nozzle is independent of the number of dispensing cycles experienced by either the valve seat of the nozzle or the tip of the valve element.

According to another aspect of the invention, a dispensing module is provided that includes a dispenser body having a liquid passageway with a valve seat and an outlet, a valve element mounted for movement along an axis between open and closed positions in the liquid passageway for selectively contacting the valve seat to selectively dispense liquid from the outlet, and a powered actuator operative for moving the valve element relative to the valve seat to provide the open and closed positions. The dispensing module further includes a biasing element operative for biasing the valve element relative to the valve seat and a load button coupling the valve element with the biasing element. The load button is engaged with the valve element for controlling lateral movement of the load button transverse to the axis of movement of the valve element.

The nozzle interchangeability lowers the ownership cost of a liquid dispensing system because the dispensing orifice diameter may be modified without purchasing an entirely new dispensing module. In addition, the capability of replacing the nozzle without replacing the entire dispensing module reduces the process downtime associated with changing the dispensing orifice diameter.

Various additional advantages and features of the invention will become more readily apparent to those of ordinary skill in the art upon review of the following detailed description taken in conjunction with the accompanying drawings.

DETAILED DESCRIPTION OF THE INVENTION

Figure 1:
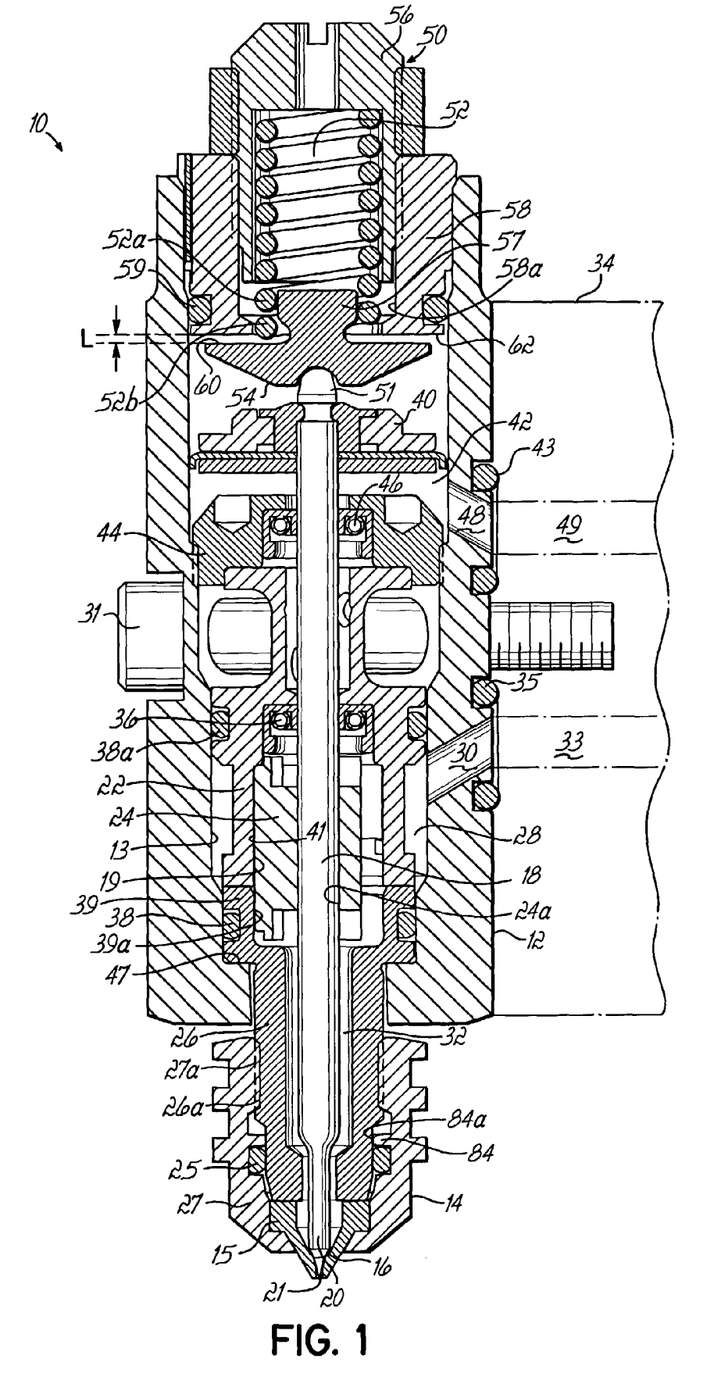
FIG. 1 is a sectional view of a dispensing module constructed in accordance with the invention.

With reference to FIG. 1 and in accordance with the principles of the invention, a dispensing device or dispensing module 10 for dispensing a viscous liquid, such as a hot melt adhesive, includes a dispenser body 12 and a nozzle 14 is coupled removably or detachably with the dispenser body 12. Dispenser body 12 may be any suitable dispenser body configured to provide a liquid flow to the nozzle 14. The dispenser body 12 includes a stepped-diameter central bore 13 receiving a valve element or needle 18 mounted for reciprocating movement within dispenser body 12. Needle 18 is an elongated shaft having a needle tip 20 at one end. Needle 18 extends through an inner bore 24a of a needle guide 24 that constrains needle 18 to perform substantially linear reciprocation relative to dispenser body 12 with an insignificant amount of lateral displacement or deflection of its elongated shaft. Positioned in a portion of central bore 13 is a seal body 22 having a hydraulic sealing element 36 that encircles needle 18. The hydraulic sealing element 36 creates a wiping action against needle 18 to inhibit liquid loss during its reciprocating movement within dispenser body 12.

Nozzle 14 includes a nozzle body 27 and a nozzle insert 15 positioned within the nozzle body 27 that carries a sealing surface or valve seat 16. The needle tip 20 of needle 18 selectively engages the valve seat 16, in association with the axial movement of the needle 18, for controlling the flow of liquid to a discharge passageway 29 (FIG. 2A) extending downstream from the valve seat 16. The liquid is discharged from a dispensing orifice or outlet 21 terminating discharge passageway 29.

With continued reference to FIG. 1, the dispenser body includes a nozzle adapter 26 that is inserted into central bore 13 and that extends partially from the dispenser body 12. The nozzle adapter 26 has a medial threaded exterior portion 26a configured to mate with an interior threaded portion 27a of nozzle body 27 for mechanically coupling or attaching the nozzle 14 with the dispenser body 12. An O-ring 25 provides a fluid seal between nozzle adapter 26 and nozzle body 27.

A liquid supply passage 28 provided in dispenser body 12 extends through the seal body 22 and needle guide 24 and includes an annular flow passageway 32 disposed between a length of the needle 18 and the nozzle adapter 26. The flow passageway 32 has an inlet coupled with a flow pathway or flow passage in the nozzle 14 provided collectively by a flow passageway 37 (FIG. 2A) upstream of the valve seat 16 and the discharge passageway 29 (FIG. 2A). Extending through the dispenser body 12 is a liquid entry port 30 that supplies pressurized liquid to liquid supply passage 28 from a liquid passage 33 of a manifold 34, which is coupled with the dispenser body 12 by a conventional threaded fastener 31. An O-ring 35 disposed concentrically about an inlet to the liquid entry port 30 insures that liquid does not leak between the dispenser body 12 and the manifold 34. Liquid from the liquid passage 33 flows through the liquid entry port 30, the liquid supply passage 28, the flow passageway 32, and the discharge passageway 29 to be dispensed from outlet 21 when the needle tip 20 is disengaged from valve seat 16 in the open position. The valve seat 16 and the needle tip 20 of needle 18 collectively provide a dispensing valve for controlling the flow of liquid from the outlet 21.

A circumferentially-extending o-ring 38 is compressed between central bore 13 and nozzle adapter 26 and, similarly, a circumferentially-extending o-ring 38a is compressed between central bore 13 and seal body 22. The o-rings 38, 38a collectively provide fluid seals that inhibit liquid loss from liquid supply passage 28.

Needle guide 24 is positioned by press fitting into a bore 19 extending through seal body 22 so that a length of circumferential surface 41 extending about needle guide 24 contacts bore 19 with an interference fit. An annular flange 39 of nozzle adapter 26 has an inwardly-facing, circumferential surface 39a press fitted with another length of circumferential surface 41. As a result, the circumferential surfaces 39a, 41 are concentric or, at the least, substantially concentric to within about 0.001 inches. The press fit between the circumferential surfaces 39a, 41, which each operate as locating elements, interrelates the needle guide 24 and the nozzle adapter 26 so that the lateral position of the needle tip 20 is predictable.

With continued reference to FIG. 1, the dispensing module 10 is actuated by an electro-pneumatic actuator including a piston assembly 40 disposed within dispenser body 12 and an air chamber 42. The piston assembly 40 is secured with a length of the needle 18 such that the piston assembly 40 and needle 18 move collectively. The air chamber 42 is disposed within dispenser body 12 between the piston assembly 40 and a seal nut 44 that isolates the air chamber 42. Seal nut 44 is threadingly engaged with a portion of the dispenser body 12 and provides an assembly force, when tightened, that captures seal body 22, needle guide 24 and nozzle adapter 26 between one side of seal nut 44 and a shoulder 47 of central bore 13. Positioned within a central recess of seal nut 44 is an air sealing element 46 having a central bore that receives a length of needle 18. Air sealing element 46 generally retains pressurized air within air chamber 42 during operation of device 10.

Extending through the dispenser body 12 is an air entry port 48 that supplies pressurized air to air chamber 42 from an air passage 49 of manifold 34. The presence of a sufficient air pressure in air chamber 42 applies a motive force to piston assembly 40 that moves needle 18 upwardly and, in particular, displaces needle tip 20 from valve seat 16 to create an open condition (FIG. 3) that permits a flow of liquid to the outlet 21. An O-ring 43 positioned concentrically about an inlet to the air entry port 48 insures that air does not leak between the dispenser body 12 and the manifold 34. A solenoid valve (not shown) regulates the flow of pressurized air to air passage 49.

With continued reference to FIG. 1, a spring return mechanism 50 maintains needle 18 in a normally closed position (FIG. 2) in which needle tip 20 is engaged with valve seat 16 to prevent liquid flow. The spring return mechanism 50 includes a biasing element or return spring 52 that applies a biasing force to a load button 54, which is coupled with a convex or rounded end 51 of needle 18. Compressing the return spring 52 against the load button 54 is a load screw 56 which is movable relative to a fixed-position sleeve 58 for varying the magnitude of the biasing force applied to the load button 54. A variation in the biasing force applied to the load button 54 changes the threshold air pressure in air chamber 42 required to move piston assembly 40 and needle 18 for disengaging needle tip 20 from valve seat 16. An O-ring 59 is disposed between sleeve 58 and dispenser body 12.

The load button 54 is provided with a concave recess 55 that is configured for engaging the rounded end 51 of needle 18 and a spring-engaging portion 57 that projects inside coils 52a, 52b of return spring 52. The engagement between the rounded end 51 and the concave recess 55 operates for limiting or preventing lateral movement or shift in position of the load button 54 in a direction transverse to the axial movement of the needle 18. To that end, the shapes of rounded end 51 and concave recess 55 may be any complementary set of geometrical shapes, such as hemispherical convex and hemispherical concave, capable of controlling the lateral shift of load button 54. Typically, the concave recess 55 is centered relative to the axis of movement of the needle 18. The projection of the engaging portion 57 inside the inner circumference of the coils 52a, 52b of return spring 52 constrains any lateral movement of coils 52a, 52b to comply with lateral movement of load button 54. It follows that, because the lateral movement of the load button 54 is controlled by the engagement between rounded end 51 and concave recess 55, the lateral movement of coils 52a, 52b is likewise controlled by the presence of engaging portion 57. As a result, coils 52a, 52b cannot move or deflect laterally by a distance sufficient to result in contact with an adjacent surface 58a of sleeve 58. The non-contacting relationship between coils 52a, 52b and the adjacent surface 58a eliminates wear that could otherwise produce unwanted wear debris, which could, for example, potentially contaminate air chamber 42. The non-contacting relationship between coils 52a, 52b and the adjacent surface 58a also prevents frictional contact therebetween that could otherwise cause drag or load, which could impede movement of needle 18.

With reference to FIG. 1, a stroke length, L, for the movement of the needle tip 20 relative to the valve seat 16 is defined by the position of a surface 60 of the load button 54 relative to a surface 62 of sleeve 58. The stroke length determines the distance that needle tip 20 will move away from valve seat 16. When a sufficient air pressure is present in air chamber 42, the force applied to the piston assembly 40 will overcome the biasing force applied by return spring 52 to the load button 54 so that the piston assembly 40 is displaced or moves in a direction away from the valve seat 16. Movement of the piston assembly 40 carries needle 18 and, therefore, load button 54 in a direction away from valve seat 16 and toward sleeve 58 until surface 60 contacts surface 62. It is contemplated that the principles of the invention are applicable to other module designs and operating mechanisms including, but not limited to, electrically-actuated dispensing modules and operating mechanisms. While the above may be a preferred pneumatically-actuated dispensing module, the principles of the invention are generally applicable to any pneumatically-actuated, electrically-actuated, or electropneumatically-actuated dispensing module.

Figure 2:
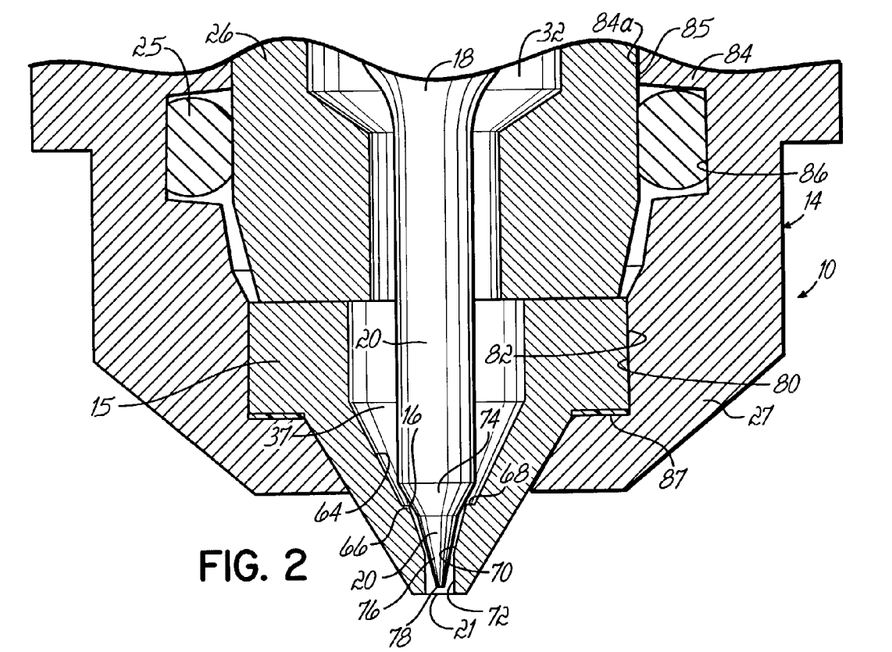
FIG. 2 is an enlarged view of a portion of the dispensing module of FIG. 1 shown with the needle tip and valve seat engaged.
Figure 2A:
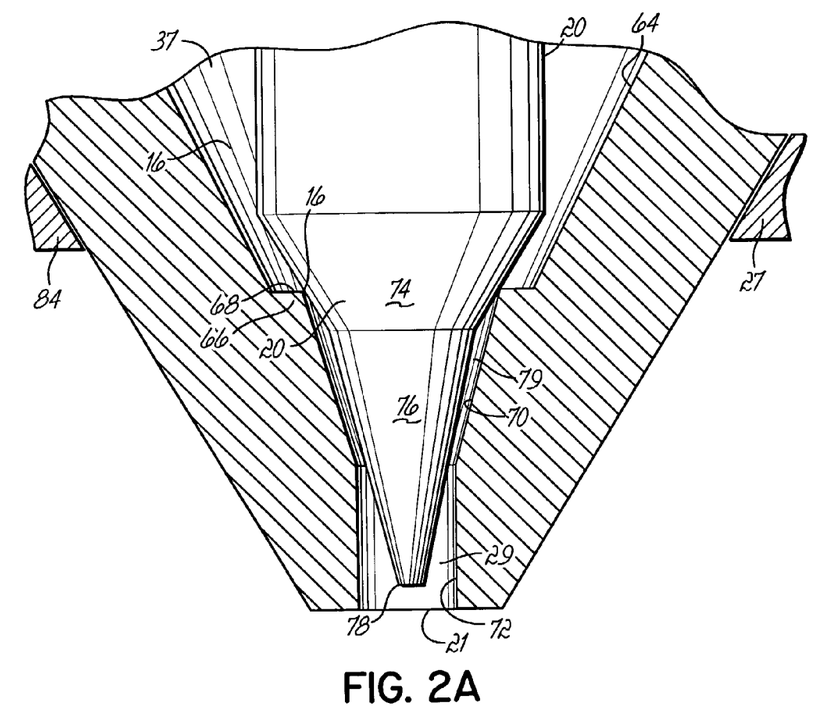
FIG. 2A is an enlarged portion of FIG. 2.
Figure 3:
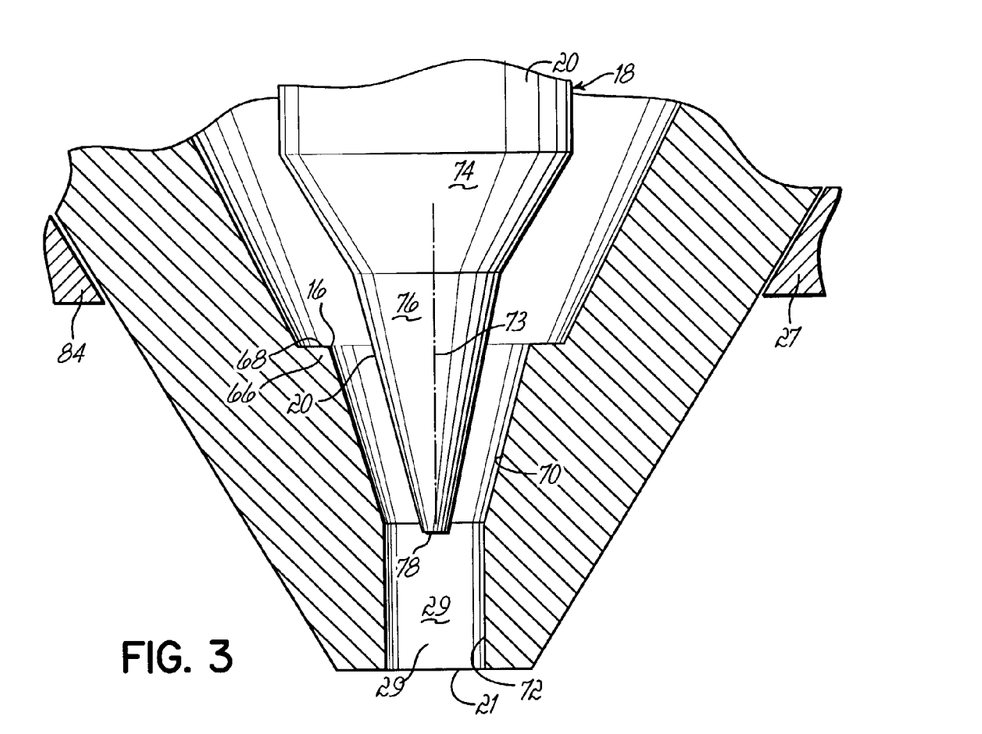
FIG. 3 is an enlarged view similar to FIG. 2 in which the needle tip is disengaged from the valve seat.

With reference to FIGS. 2 and 3, the nozzle insert 15 includes a frustoconical bore or surface 64, a shoulder 66 carrying valve seat 16 and having a planar annular surface 68 facing toward the nozzle adapter 26, and a frustoconical bore or surface 70 positioned between the valve seat 16 and a cylindrical surface or bore 72 which extends toward and terminates at the outlet 21. Valve seat 16 provides a sharp circumferential edge that defines a circular line of contact with the needle tip 20. The valve seat 16 is centered or coaxial with, and radially symmetric relative to, a longitudinal axis 73. Frustoconical surface 70 tapers conically inward from the valve seat 16 toward the cylindrical surface 72 with a given taper angle measured relative to the longitudinal axis 73.

The needle tip 20 includes two frustoconical surfaces 74, 76 formed with a compound angle and a blunt apex 78 terminating frustoconical surface 74 adjacent to the apex 78. It is contemplated by the invention that the frustoconical surfaces 74, 76 may be in actual contact or coextensive, or may be adjacent though not coextensive, so as to be contiguous. A circumferential portion of frustoconical surface 74 contacts the valve seat 16 to create a circular line of contact, which provides a sealing engagement in the closed position that blocks the flow of liquid from the flow passageway 32 to the discharge passageway 29. The sealing engagement between needle tip 20 and valve seat 16 occurs exclusively along the line of contact. Each of the frustoconical surfaces 74, 76 of needle tip 20 is centered along, and radially symmetric or coaxial about, longitudinal axis 73. Therefore, the line of contact between valve seat 16 and frustoconical surface 74 is substantially centered or coaxial with respect to longitudinal axis 73.

With continued reference to FIGS. 2 and 3, frustoconical surface 74 tapers conically toward apex 78 with a first included angle and frustoconical surface 76 tapers conically toward apex 78 with a second included angle smaller than the first included angle. Typically, the second included angle is smaller than the first included angle by about 5°. The taper angle of frustoconical surface 70 is greater than or equal to the second included angle of the frustoconical surface 76 such that the volume of a cavity 79 defined therebetween is reduced. As a result, the volume of residual liquid remaining in cavity 79 after the dispensing valve is opened and closed to provide one dispensing cycle is minimized. In one embodiment, the first included angle is about 60°, the second included angle is about 28°, and the taper angle of frustoconical surface 70 is about 32°.

The sharpness or abruptness of the circular line of contact provided by the line of contact between valve seat 16 and frustoconical surface 74 operates to cut through any foreign debris, such as char from degraded liquid, that may flow through flow passageway 32 toward the vicinity of the valve seat 16. As a result, the flow of liquid is cleanly discontinued when the needle 18 is moved from its open position to engage the frustoconical surface 74 with valve seat 16. In addition, the line of contact provides a positive sealing action that prevents leakage when the needle 18 is in a closed position. Any foreign debris present in the discharge passageway 29 is pushed out of the outlet 21 by the reciprocating movement of the needle tip 20. In particular, the relationship between the taper angle of frustoconical surface 70 and the second included angle of the frustoconical surface 76 maximize the engagement or penetration depth of the apex 78 into the discharge passageway 29. As a result, the ability of needle tip 20 to clear foreign debris by the action of the needle 18 is significantly improved such that the outlet 21 is less likely to be blocked or occluded.

A diameter change for the outlet 21 is accomplished by merely changing the diameter of the cylindrical surface 72 without modifying frustoconical surface 70. It follows that location of valve seat 16 is unaffected by modification of the orifice diameter and, as a result, frustoconical surface 74 of needle tip 20, and typically a substantial constant circumferential portion of frustoconical surface 74, will engage the valve seat 16 independent of the diameter of the outlet 21. The circular line of contact provided by the engagement between valve seat 16 and frustoconical surface 74 is substantially invariant, other than variations due to wear, abrasion, deformation and other effects of use. It is appreciated that, due to factors such as forming variations and machining tolerances of, for example, nozzle 14 and needle 18, the circular area of contact may vary among different nozzles 14 so that a slightly different portion of frustoconical surface 74 may contact the valve seat 16 when different nozzles 14 are attached to the dispenser body 12 of dispensing module 10. It is appreciated that the circumferential edge of valve seat 16 may become slightly rounded or blunted during use due to wear.

With reference to FIG. 2, the nozzle insert 15 includes an outer cylindrical surface 82 that is press fit or friction fit within a bore defined by an axially-extending cylindrical surface 80 provided in nozzle body 27. Typically, the diameters of the cylindrical surfaces 80, 82 are equal to within less than about 0.002 inches. The outer cylindrical surface 82 is coaxial with or, at the least, substantially coaxial with the cylindrical surface 80 of the nozzle body 27. The press fit aligns nozzle insert 15 so that the valve seat 16 and cylindrical surface 82 are concentric because frustoconical surface 70 has a concentric relationship with cylindrical surface 82. It is contemplated by the invention that the nozzle insert 15 may be integral with the nozzle body 27 so as to provide a one-piece, unitary structure for nozzle 14.

With reference to FIGS. 1 and 2, extending about an inner circumference of the nozzle body 27 is an inwardly-projecting, circumferentially-extending locating element or flange 84 that participates in capturing O-ring 25 by providing one radially-extending wall of an O-ring gland 86. A circumferentially-extending surface 84a of flange 84 is axially centered about longitudinal axis 73 (FIG. 3), when the nozzle 14 is coupled with nozzle adapter 26. Circumferential surface 84a is machined concurrently with cylindrical surface 80 so as to achieve concentricity with each other. The diameter of circumferential surface 84a is substantially equal to an outer diameter of a circumferential surface 85 extending about nozzle adapter 26. Preferably, the diameters of circumferential surfaces 84a and 85 are equal to within about 0.001 inches with a tolerance of ±0.005 inches so that the nozzle body 27 may be coupled with the nozzle adapter 26 without binding.

When the nozzle 14 is attached to the nozzle adapter 26, the concentricity between the circumferential surfaces 84a and 85, the concentricity between the circumferential surface 84a and the cylindrical surface 80, and the press fit between cylindrical surfaces 80, 82 cooperate for accurately aligning the valve seat 16 to provide a sealing line of contact with frustoconical surface 74. Specifically, these relationships result in the valve seat 16 and the circumferential surface 84a being concentric or coaxial. Cylindrical surface 85 is concentric or coaxial with longitudinal axis 73 because of the constraint provided by the bore 24a of needle guide 24 and the concentricity of circumferential surfaces 39a, 41. The position of the needle tip 20 is predictable with respect to the nozzle adapter 26 and to cylindrical surface 85 because of the guidance provided to needle 18 by the inner bore 24a of the needle guide 24. It follows that the location of the circular line of contact provided by the valve seat 16 is also predictable relative to the longitudinal axis 73 of the needle tip 20. The location of the circular line of contact is not dependent upon the mating engagement between the threaded exterior portion 26a of nozzle adapter 26 and the threaded portion 27a of nozzle body 27, so that the line of contact is reproducible among various different nozzles 14 detachable coupled with the dispenser body 12. It is contemplated by the invention that the nozzle adapter 25 and the dispenser body 12 may have a unitary construction.

Additional fluid sealing is provided by a polytetrafluoroethylene (PTFE) crush ring 87 captured between the nozzle insert 15 and the nozzle body 27 and the compression of O-ring 25 between the nozzle adapter 26 and the nozzle body 27. Moreover, an upwardly-facing surface of the nozzle insert 15 has an abutting relationship with a downwardly-facing surface of the nozzle adapter 26 to provide an annular contact or sealing zone that participates in sealing the flow passageway 32. As a result, there is no available escape route to the exterior of the nozzle 14 for liquid flowing in flow passageway 37 within the nozzle insert 15.

With continued reference to FIGS. 1 and 2, the needle 18 and nozzle insert 15 are each formed as shaped metal components by conventional casting, forging or milling techniques. In one aspect of the invention, the material forming needle tip 20 is harder, or has a greater surface hardness, than the material forming valve seat 16. Because of the relationship between the surface hardnesses, the frustoconical surface 74 of needle tip 20 experiences less wear and deformation, and preferably a significantly reduced wear and deformation, than the valve seat 16 arising from forces applied by cyclic contact between valve seat 16 and needle tip 20 during operation of the dispensing module 10. As a result, the appearance of surface imperfections on the frustoconical surface 74 is limited because any such surface imperfections are created in the softer valve seat 16.

In certain embodiments of the invention, the material forming needle 18, or at least the needle tip 20, has a surface hardness ranging from about 10 points to about 30 points higher on the Rockwell C scale than a surface hardness of the material forming nozzle insert 15, or at least the material forming valve seat 16. In other embodiments of the invention, the surface hardness of the material forming needle 18, or at least the needle tip 20, ranges from about 10 points to about 20 points higher on the Rockwell C scale than the surface hardness of the material forming nozzle insert 15, or at least the material forming the valve seat 16. In still other embodiments, the material forming needle 18, or at least the needle tip 20, has a surface hardness that is about 20 points higher on the Rockwell C scale than a surface hardness of the material forming nozzle insert 15, or at least the material forming the valve seat 16.

The needle 18 and/or needle tip 20 and the nozzle insert 15 and/or the valve seat 16 may be formed from any set of materials having suitable surface hardnesses or which are capable of being treated, such as by a heat treatment or by induction hardening, to provide the difference in surface hardness. For example, the needle 18 may be fabricated from a suitable steel, such as 52100 steel, that is heat treated to provide a surface hardness for the needle tip 20 in the range of about HRC47 to about HRC53 on the Rockwell C scale and the nozzle insert 15 may be formed from a suitable steel, such as 17-4 stainless steel, having a surface hardness in the range of about HRC29 to about HRC35 on the Rockwell C scale, and typically, about HRC32.

With continued reference to FIG. 2, the frustoconical surface 74 of needle tip 20 is provided with a surface finish of Ra less than or equal to about 32 microinches that limits the feature size of surface imperfections formed in the valve seat 16. In certain embodiments of the invention, the surface finish may have an Ra of less than or equal to about 16 microinches. In other embodiments of the invention, the surface finish may have an Ra of less than or equal to about 8 microinches. Surface imperfections created by the frustoconical surface 74 of the needle tip 20 in the softer material of the valve seat 16 have a fine or dimensionally small feature size and, preferably, the feature size of the surface imperfections is finer or less than a dimension that would otherwise allow leakage of the liquid past the line of contact between the valve seat 16 and the needle tip 20 in the closed position.

The surface finish is applied to the frustoconical surface 74 of needle tip 20 by any suitable abrasive surface finishing process capable of obtaining such surface finishes and providing a high degree of dimensional accuracy. For example, one suitable abrasive surface finishing process is centerless grinding in which the needle tip 20 is placed unconstrained between a pair of wheels. One of the wheels is a grinding wheel that precision grinds the part while the other of the wheels is a regulating wheel that causes the needle tip 20 to rotate. The grinding surface of the grinding wheel is impregnated with an abrasive, such as silicon carbide or diamond, that removes material in an abrasive action to shape and smooth the frustoconical surface 74 of the needle tip 20 to provide the desired surface finish. It is appreciated that the frustoconical surface 76 may be provided with a surface finish similar to frustoconical surface 74.

The surface finish of the frustoconical surface 74, following the grinding process, is quantified using a technique of surface metrology, such as by mechanically scanning a stylus across the surface to measure a surface roughness profile. A representative parameter for statistically quantifying the surface roughness profile is Ra, which is defined as an arithmetic average of the absolute value of the departures of the surface roughness profile from a mean line on the surface. Generally, the lower the Ra value, the smoother the surface finish.

Figure 4:
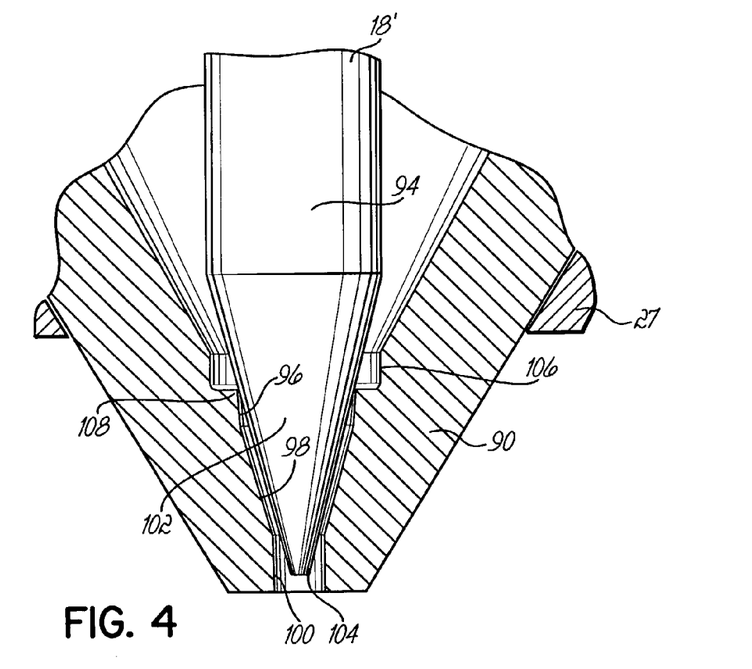
FIG. 4 is an enlarged view similar to FIG. 2A illustrating an alternative embodiment of the dispensing module of the invention.

With reference to FIG. 4 in which like reference numerals refer to like features in FIGS. 1-3 and in an alternative embodiment of the invention, the dispensing module 10 is provided with a nozzle insert 90 and a needle 18' is provided with a needle tip 94. The nozzle insert 90 is press fit into the nozzle body 27, as described herein with regard to nozzle insert 15 (FIGS. 1-3). The nozzle insert 90 includes two successive frustoconical surfaces 96, 98 tapering conically in a direction toward the outlet 21 and a cylindrical surface 100 extending from the tapered surface 98 to the outlet 21. The frustoconical surfaces 96, 98 are formed with a compound angle so that surface 96 has a greater conical taper angle than surface 98. Generally, the conical taper angle of frustoconical surface 96 is at least about 5° larger than about the conical taper angle of frustoconical surface 98. The needle tip 20 includes a frustoconical surface 102 extending to a blunt apex 104, in which the frustoconical surface 102 has a substantially uniform included angle. Generally, the included angle of the frustoconical surface 102 is approximately equal to the taper angle of frustoconical surface 98.

Provided in the nozzle insert 90 above the frustoconical surface 96 is a side wall portion 106 defining a countersunk recess. A valve seat 108 is defined by a corner at the juncture of side wall portion 106 and the frustoconical surface 96. Valve seat 108 provides a sharp circular line of contact that engages a contacting portion of the frustoconical surface 102 to provide a sealing engagement in the closed position that blocks the flow of liquid from the flow passageway 32 to the outlet 21. The frustoconical surface 102 of needle tip 94 has a surface finish as described herein with regard to frustoconical surface 74 of needle tip 20 (FIGS. 1-3). In addition, the material forming needle 18' and/or needle tip 94 has a greater surface hardness than the material forming nozzle insert 90 and/or valve seat 108, similar to the relationship between the surface hardnesses of the material forming needle 18 and/or needle tip 20 and the material forming the nozzle insert 15 and/or the valve seat 16.

While the present invention has been illustrated by a description of various preferred embodiments and while these embodiments have been described in considerable detail in order to describe the best mode of practicing the invention, it is not the intention of the applicant to restrict or in any way limit the scope of the appended claims to such detail. Additional advantages and modifications within the spirit and scope of the invention will readily appear to those skilled in the art. The invention itself should only be defined by the appended claims, wherein I claim:

The invention claimed is:

1. A nozzle for an adhesive dispensing module, comprising:
a nozzle member including an inlet, an outlet, a liquid passageway extending from said inlet to said outlet, and a valve seat in said liquid passageway between said inlet and said outlet, said liquid passageway including a first frustoconical surface tapering conically toward said outlet, a second frustoconical surface tapering conically toward said outlet, and a shoulder positioned between said first and second frustoconical surfaces, and said valve seat being defined at an intersection between said shoulder and said first frustoconical bore as a circular line of contact positioned between said inlet and said first frustoconical surface.

2. The nozzle of claim 1 wherein said nozzle member includes a nozzle body with a bore and an insert carrying said liquid passageway and said valve seat, said insert being dimensioned to be pressed into said bore with an interference fit.

3. The nozzle of claim 1 wherein said first frustoconical surface and said valve seat having a coaxial arrangement.

4. The nozzle of claim 3 wherein said passageway includes a second frustoconical surface extending from said valve seat toward said outlet, said second frustoconical surface positioned between said first frustoconical surface and said outlet.

5. The nozzle of claim 4 wherein said first and said second frustoconical surfaces are contiguous.

6. The nozzle of claim 4 wherein said first frustoconical surface has a first conical taper angle and said second frustoconical surface has a second conical taper angle, said first taper angle being larger than said second taper angle.

7. The nozzle of claim 6 wherein said first conical taper angle is at least about 5° larger than said second conical taper angle.

8. The nozzle of claim 1 wherein said outlet of said liquid passageway is a first cylindrical surface adjoining said first frustoconical surface.

9. The nozzle of claim 8 wherein said inlet of said liquid passageway is a second cylindrical surface adjoining said second frustoconical surface.

10. An adhesive nozzle for removable mounting with an adhesive dispenser body in an adhesive dispensing system, the dispenser body further including a threaded portion, a liquid supply passage and a movable valve element carrying a sealing surface centered symmetrically about an axis, comprising:
an adhesive nozzle member including a liquid passageway coupled in fluid communication with the liquid supply passage, a valve seat positioned in said liquid passageway, a dispensing orifice downstream of said valve seat, a threaded portion adapted to engage the threaded portion of the dispenser body, and a locating element substantially concentric with said valve seat, said valve seat selectively contacted by the sealing surface for regulating adhesive flow in said liquid passageway to said dispensing orifice, said locating element positioned between said threaded portion of said nozzle member and said valve seat, and said locating element configured for positioning said valve seat in a substantially coaxial relationship with the axis when said nozzle member is mounted to the dispenser body.

11. The nozzle of claim 10 wherein said valve seat and the sealing surface have a circular line of contact when engaged.

12. The nozzle of claim 10 wherein said nozzle member includes an inner surface, and said locating element is a circumferential flange projecting inwardly from said inner surface toward the dispenser body and contacting the dispenser body to define the substantially coaxial relationship of said valve seat with the axis.

13. The nozzle of claim 10 wherein said nozzle member includes a cylindrical bore substantially concentric with said locating element and an insert carrying said valve seat, said insert having a cylindrical outer surface that is substantially concentric with said valve seat, said cylindrical outer surface being dimensioned to be pressed into said cylindrical bore with an interference fit so that said insert is centered relative to said cylindrical bore.

14. The nozzle of claim 10 wherein said valve seat is circular, and said discharge passageway includes a first frustoconical surface extending from said valve seat toward said dispensing orifice.

15. The nozzle of claim 14 wherein said discharge passageway includes a second frustoconical surface extending from said valve seat toward said dispensing orifice, said second frustoconical surface positioned between said first frustoconical surface and said dispensing orifice.

16. The nozzle of claim 15 wherein said first and said second frustoconical surfaces are contiguous.

17. The nozzle of claim 15 wherein said first frustoconical surface has a first conical taper angle and said second frustoconical surface has a second conical taper angle, said first taper angle being larger than said second taper angle.

18. The nozzle of claim 17 wherein said first conical taper angle is at least about 5° larger than said second conical taper angle.

19. A dispensing module for dispensing an adhesive, comprising:
a dispenser body having a threaded portion, a liquid supply passage, and a movable valve element carrying a sealing surface centered symmetrically about an axis; and
a nozzle member removably mounted to the dispenser body, said nozzle member including a liquid passageway coupled in fluid communication with said liquid supply passage, a valve seat positioned in said liquid passageway, a dispensing orifice downstream of said valve seat, a threaded portion adapted to engage said threaded portion of said dispenser body, and a first locating element substantially concentric with said valve seat, said valve seat selectively contacted by said sealing surface for regulating liquid flow in said liquid passageway to said dispensing orifice, said first locating element positioned between said threaded portion of said nozzle member and said valve seat, and said first locating element configured for positioning said valve seat in a substantially coaxial relationship with said axis when said nozzle member is mounted to said dispenser body.

20. The dispensing module of claim 19 wherein said dispenser body further comprises:
a guide cooperating with said valve element for maintaining said sealing surface in alignment with said axis; and
a nozzle adapter having a first end coupled with said dispenser body and an opposite second end extending outwardly from said dispenser body, said nozzle adapter including a second locating element having a contacting relationship with said guide for aligning said nozzle adapter relative to said axis and a third locating element concentric with said second locating element, said third locating element having a contacting relationship with said first locating element.

21. The dispensing module of claim 19 wherein said sealing surface and said valve seat have a circular line of contact when engaged.

22. The dispensing module of claim 19 wherein said nozzle member includes an inner surface, and said locating element is a circumferential flange projecting inwardly from said inner surface toward the dispenser body and contacting said dispenser body to define the substantially coaxial relationship of said valve seat with the axis.

23. The dispensing module of claim 19 wherein said nozzle member includes a cylindrical bore substantially concentric with said locating element and an insert carrying said valve seat, said insert having a cylindrical outer surface that is substantially concentric with said valve seat, said cylindrical outer surface being dimensioned to be pressed into said cylindrical bore with an interference fit so that said insert is centered relative to said cylindrical bore.

24. The dispensing module of claim 19 wherein said valve seat is circular, and said valve element includes an apex, a first frustoconical surface capable of contacting said valve seat, and a second frustoconical surface contiguous with said first frustoconical surface and positioned between said first frustoconical surface and said apex, said first and said second frustoconical surfaces tapering conically toward said apex, said first frustoconical surface having a first included angle and said second frustoconical surface having a second included angle smaller, said first included angle being larger than said second included angle.

25. The dispensing module of claim 24 wherein said first included angle is at least about 5° larger than said second included angle.

26. The dispensing module of claim 24 wherein said nozzle body includes a discharge passageway between said valve seat and said dispensing orifice, said discharge passageway including a third frustoconical surface tapering conically from said valve seat toward said dispensing orifice, said third frustoconical surface having a conical taper angle greater than or equal to said second included angle.

27. The dispensing module of claim 19 wherein said valve seat is circular, and said discharge passageway includes a first frustoconical surface and a second frustoconical surface contiguous with said first frustoconical surface, said first and said second frustoconical surfaces extending from said valve seat toward said dispensing orifice, said second frustoconical surface positioned between said first frustoconical surface and said dispensing orifice.

28. The dispensing module of claim 27 wherein said first frustoconical surface has a first conical taper angle and said second frustoconical surface has a second conical taper angle, said first taper angle being larger than said second taper angle.

29. The dispensing module of claim 28 wherein said first conical taper angle is at least about 5° larger than said second conical taper angle.

30. The dispensing module of claim 27 wherein said valve element includes an apex and a third frustoconical surface tapered conically toward said apex, said third frustoconical surface having a conical taper angle greater than or equal to said second included angle.

31. A valve element for engaging a valve seat of a dispensing module, comprising:
an elongated body having an apex, a first frustoconical surface configured to make a sealing engagement with the valve seat, and a second frustoconical surface coextensive with said first frustoconical surface and positioned between said first frustoconical surface and said apex, said first frustoconical surface having a first included angle that tapers conically toward said apex, and said second frustoconical surface having a second included angle that tapers conically toward said apex, said first included angle being larger than said second included angle.

32. The valve element of claim 31 wherein said first included angle is at least about 5° larger than said second included angle.

33. A nozzle for an adhesive dispenser module having a dispenser body, a liquid supply passage in the dispenser body, and a movable valve element carrying a sealing surface centered symmetrically about an axis, comprising:
a nozzle member configured to be detachably mounted to the dispenser body said nozzle body including a cylindrical bore; and
an insert including a cylindrical outer surface pressed within said cylindrical bore with an interference fit, said insert further including a valve seat, a flow passageway upstream of said valve seat that is coupled in fluid communication with the liquid supply passage when said nozzle member is mounted to the dispenser body, a discharge passageway downstream of said valve seat, and a dispensing orifice terminating said discharge passageway, said valve seat selectively contacted by the sealing surface for regulating adhesive flow in said liquid passageway to said dispensing orifice, said interference fit between said cylindrical outer surface of said insert and said cylindrical bore of said nozzle member aligning said valve seat substantially concentric with the axis and thereby establishing a line of contact between said valve seat and the sealing surface that is substantially concentric with the axis.

34. The nozzle of claim 33 wherein said nozzle member includes a locating element contacting the dispenser body when said nozzle member is mounted to the dispenser body, the contact between said locating element and the dispenser body cooperating with said interference fit between said cylindrical outer surface of said insert and said cylindrical bore for centering said valve seat relative to the axis of the valve element.

35. The nozzle of claim 33 further comprising:
a nozzle adapter extending from the dispenser body, said nozzle member being configured to be removably mounted in a threaded engagement with said nozzle adapter.

36. The nozzle of claim 35 wherein said nozzle member includes a locating element contacting said nozzle adapter when said nozzle is mounted to said nozzle adapter, wherein the contact between said locating element and said nozzle adapter participates in centering said valve seat of said insert with respect to the axis.

37. A dispensing module for dispensing an adhesive, comprising:
a dispenser body including a liquid passageway with a valve seat and an outlet;
a valve element mounted for movement along an axis between open and closed positions in said liquid passageway for selectively contacting said valve seat to selectively dispense adhesive from said outlet, said valve element having a first end adapted to engage the valve seat to provide the open and closed positions and a second end opposite the first end;
a powered actuator operative for moving said valve element relative to said valve seat to provide the open and closed positions;
a biasing element operative for biasing said valve element relative to said valve seat; and
a load button coupling said valve element with said biasing element, said load button including an engagement element engaged with said second end of said valve element for controlling lateral movement of said load button transverse to said axis of movement of said valve element.

38. The dispensing module of claim 37, wherein said powered actuator further comprises an air actuator.

39. The dispensing module of claim 37, wherein said engagement element of said load button is a recess, and said second end of said valve element is rounded and positioned within said recess in contact with said load element.

40. The dispensing module of claim 39, wherein said recess is centered relative to said axis of movement of said valve element.

41. A flow control device for an adhesive dispenser, comprising:

a valve element having an apex, a first frustoconical surface, and a second frustoconical surface positioned between said first frustoconical surface and said apex, said first frustoconical surface having a first included angle that tapers conically toward said apex, and said second frustoconical surface having a second included angle that tapers conically toward said apex, said first included angle being larger than said second included angle; and a nozzle including an inlet, an outlet, and a liquid passageway extending from said inlet to said outlet, said liquid passageway including a third frustoconical surface tapering conically toward said outlet and a valve seat between said inlet and said third frustoconical surface, said second frustoconical surface being spaced from said third frustoconical surface when said first frustoconical surface is in contact with said valve seat to define a circular line of contact.

42. The valve element of claim 41 wherein said first included angle is at least about 5° larger than said second included angle.

43. The nozzle of claim 41 wherein said liquid passageway includes a shoulder, said circular line of contact being defined by an intersection between said shoulder and said third frustoconical surface.

44. The nozzle of claim 43 wherein said liquid passageway includes a fourth frustoconical surface tapering conically toward said outlet, and said shoulder is positioned between said third and fourth frustoconical surfaces.

45. The nozzle of claim 44 wherein said outlet of said liquid passageway is a first cylindrical surface adjoining said third frustoconical surface.

46. The nozzle of claim 45 wherein said inlet of said liquid passageway is a second cylindrical surface adjoining said fourth frustoconical surface.

* * * * *

UNITED STATES PATENT AND TRADEMARK OFFICE
CERTIFICATE OF CORRECTION

PATENT NO. : 8,069,653 B2  
APPLICATION NO. : 10/271644  
DATED : December 6, 2011  
INVENTOR(S) : Charles P. Ganzer Page 1 of 1

It is certified that error appears in the above-identified patent and that said Letters Patent is hereby corrected as shown below:

At column 1, line number 17, after "electro-pneumatically", insert --actuated--.

At column 2, line number 10, change "detachables" to --detachable--.

At column 3, line number 17, change "addresses" to --address--.

At column 8, line number 47, change "detachable" to --detachably--.

In the Claims:

At column 14, claim number 33, line number 2, after "dispenser body", insert --,--.

Signed and Sealed this  
Twenty-first Day of February, 2012

David J. Kappos  
*Director of the United States Patent and Trademark Office*